United States Patent
Roth et al.

(10) Patent No.: US 8,749,936 B2
(45) Date of Patent: *Jun. 10, 2014

(54) SEMICONDUCTOR DEVICE AND APPARATUS INCLUDING SEMICONDUCTOR DEVICE

(75) Inventors: Andreas Roth, Guenzenhausen (DE); Hubert Bode, Haar (DE); Andreas Laudenbach, Haag (DE); Engelbert Wittich, Wartenberg (DE); Stephan Lehmann, Garching (DE)

(73) Assignee: Freescale Semiconductor, Inc., Austin, TX (US)

( * ) Notice: Subject to any disclaimer, the term of this patent is extended or adjusted under 35 U.S.C. 154(b) by 741 days.

This patent is subject to a terminal disclaimer.

(21) Appl. No.: 12/745,966

(22) PCT Filed: Dec. 6, 2007

(86) PCT No.: PCT/IB2007/054949
§ 371 (c)(1),
(2), (4) Date: Jun. 3, 2010

(87) PCT Pub. No.: WO2009/071965
PCT Pub. Date: Jun. 11, 2009

(65) Prior Publication Data
US 2010/0277205 A1    Nov. 4, 2010

(51) Int. Cl.
*H02H 9/02* (2006.01)
(52) U.S. Cl.
USPC ........................................................ 361/93.1
(58) Field of Classification Search
USPC ........................................................ 361/93.1
See application file for complete search history.

(56) References Cited

U.S. PATENT DOCUMENTS

| 4,353,105 | A | | 10/1982 | Black |
| 5,168,340 | A | * | 12/1992 | Nishimura .................... 257/376 |
| 5,173,149 | A | | 12/1992 | Nojiri et al. |
| 5,621,742 | A | | 4/1997 | Yoshino |
| 6,275,972 | B1 | | 8/2001 | Long et al. |
| 6,798,250 | B1 | * | 9/2004 | Wile ............................... 327/51 |
| 6,850,396 | B1 | * | 2/2005 | Clemo et al. .................... 361/78 |

(Continued)

FOREIGN PATENT DOCUMENTS

| DE | 19958204 A1 | 6/2001 |
| JP | 02188130 A | 7/1990 |

(Continued)

OTHER PUBLICATIONS

Non-Final Office Action mailed Feb. 17, 2012 for U.S. Appl. No. 12/745,973, 8 pages.
Notice of Allowance mailed Jul. 17, 2012 for U.S. Appl. No. 12/745,973, 7 pages.

(Continued)

*Primary Examiner* — Rexford Barnie
*Assistant Examiner* — Tien Mai

(57) ABSTRACT

A semiconductor device includes a substrate on which an electronic circuit is provided. One or more pads may be present which can connect the electronic circuit to an external device outside the substrate. A current meter is electrically in contact with at least a part of the substrate and/or the pad. The meter can measure a parameter forming a measure for an amount of a current flowing between the substrate and at least one of the at least one pad. A control unit is connected to the current meter and the electronic circuit, for controlling the electronic circuit based on the measured parameter.

20 Claims, 2 Drawing Sheets

(56) References Cited

U.S. PATENT DOCUMENTS

| | | | |
|---|---|---|---|
| 7,232,526 B2 | 6/2007 | Livengood et al. | |
| 2002/0079859 A1* | 6/2002 | Lumsden | 318/727 |
| 2003/0222703 A1 | 12/2003 | Ker et al. | |
| 2006/0262473 A1* | 11/2006 | Neesgaard et al. | 361/93.1 |
| 2007/0091527 A1* | 4/2007 | Julicher | 361/93.1 |
| 2007/0164774 A1 | 7/2007 | Cecchi | |
| 2007/0188961 A1 | 8/2007 | Tailliet | |
| 2010/0253422 A1 | 10/2010 | Roth et al. | |

FOREIGN PATENT DOCUMENTS

| | | |
|---|---|---|
| JP | 03108368 A | 5/1991 |
| JP | 05038039 A | 2/1993 |
| JP | 08255872 A | 10/1996 |
| WO | 2007/047804 A | 4/2007 |

OTHER PUBLICATIONS

International Search Report and Written Opinion correlating to PCT/IB2007/054949 dated Aug. 19, 2008.

* cited by examiner

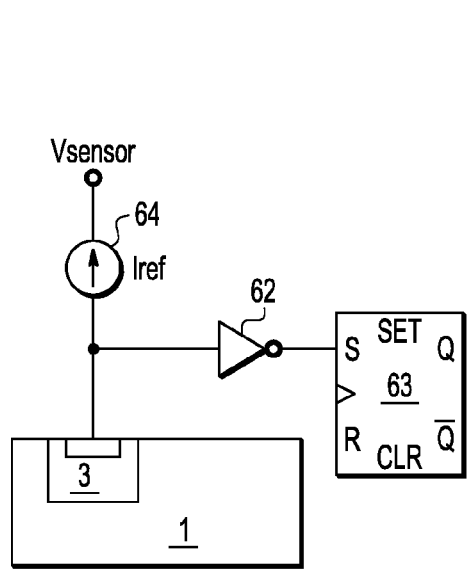
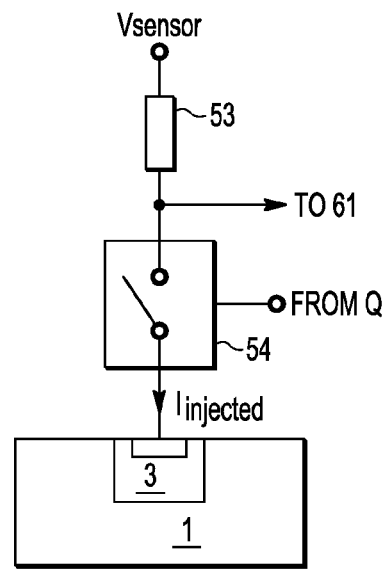
FIG. 3
FIG. 4
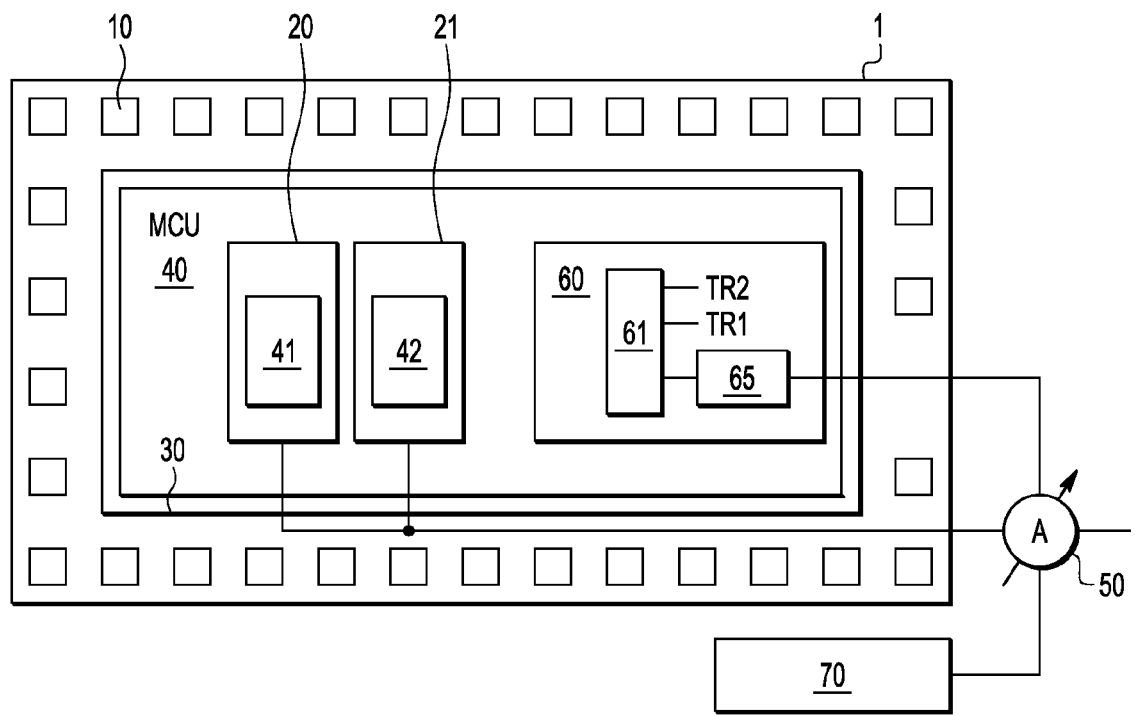
FIG. 5

SEMICONDUCTOR DEVICE AND APPARATUS INCLUDING SEMICONDUCTOR DEVICE

CROSS-REFERENCE TO RELATED APPLICATION(S)

This application is related to U.S. patent application Ser. No. 12/745,973, entitled "SEMICONDUCTOR DEVICE AND APPARATUS INCLUDING SEMICONDUCTOR DEVICE," filed on Jun. 3, 2010, which is a National Stage Entry under 37 C.F.R. 371 of International Application No. PCT/IB2008/054987, filed Nov. 27, 2008, which claims priority to International Application No. PCT/IB2007/054949, filed Dec. 6, 2007.

FIELD OF THE INVENTION

This invention relates to a semiconductor device and to an apparatus including a semiconductor device.

BACKGROUND OF THE INVENTION

Semiconductor integrated circuits are known in the art. Typically, integrated circuits include a package which contains one or more substrates or "dies". The substrates may be provided with electronic circuits and be provided with pads via which the substrates (and the electronic circuits) can be connected to the outside world, e.g. via bond-wires that are connected to pins which extend from the package inside to the exterior of the package.

However, a general problem is that current may be injected into the substrate, for example when a pad is driven below or above the supply voltage, which may affect the operation of the electronic circuit.

In order to prevent the injected current from affecting the operation, it is known to implement a so called "guard ring" which shields the electronic circuit from the injected current. For example, U.S. Pat. No. 5,168,340 describes a passive latch-up protection improvement in which polysilicon lines cross or cut a guard-ring around a logic circuit. When an amount of injected current exceeds a certain magnitude, latch up of the transistors in the logic circuit occurs and the transistors are shut off.

SUMMARY OF THE INVENTION

The present invention provides a semiconductor device and an apparatus as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings.

FIG. 3 schematically shows a first example of a circuit which may be used in the example of FIGS. 1 and 2.

FIG. 4 schematically illustrates shows a second example of a circuit which may be used in the example of FIGS. 1 and 2.

FIG. 5 schematically shows top-view of a second example of an embodiment of a semiconductor device.

DETAILED DESCRIPTION OF THE PREFERRED EMBODIMENTS

Figure 1:
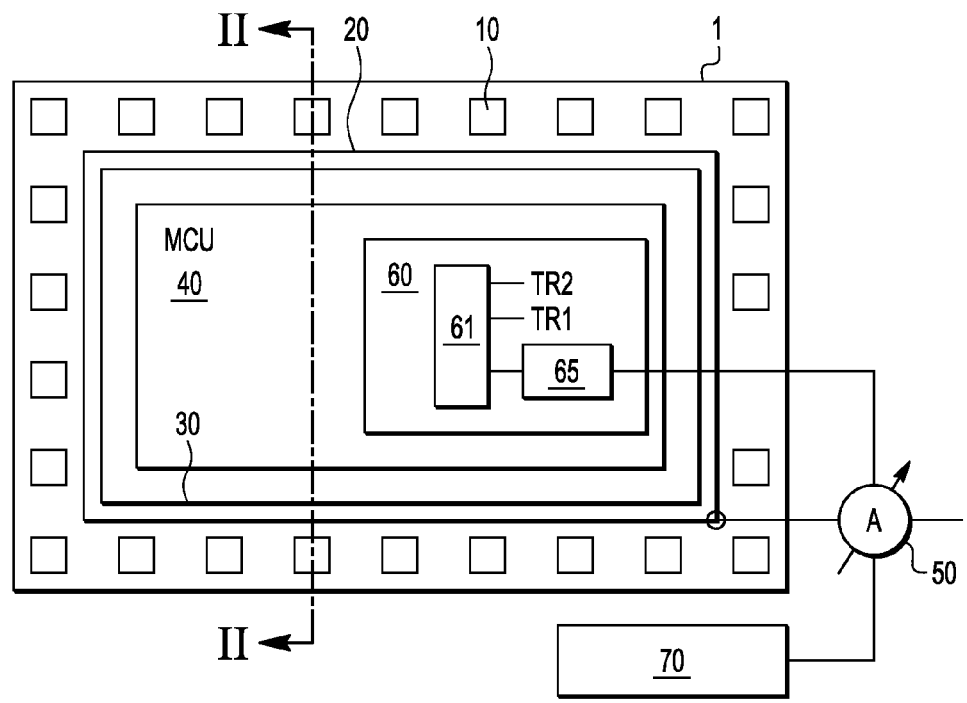
FIG. 1 schematically shows top-view of a first example of an embodiment of a semiconductor device FIG. 2 schematically shows a cross-sectional view of the example of FIG. 1 taken along a part of the line II-II in FIG. 1.

Referring to FIG. 1, a semiconductor device is shown. The semiconductor device may include a substrate 1 on which an electronic circuit 40 is provided. In this example, the electronic circuit 40 is a logic circuit. The logic circuit may for example be a microprocessor and may for example include a central processing unit (CPU) and/or a coprocessor and/or a digital signal processor and/or an embedded processor. The electronic circuit 40 may also include a microcontroller (μC). In addition to or as an alternative to the logic circuit, other devices and/or circuitry may be present in the electronic circuit 40, such as for example high voltage device and/or volatile or non-volatile memory and/or analog circuitry. Also, other electronic circuits may be present on the substrate 1.

As shown in FIG. 1, the semiconductor device may include one or more pads 10. Via the pads, the electronic circuit 40 may be connected to an external device outside the substrate. Although not shown in FIG. 1, it will be apparent that an electrically conducting path may be present between the pads 10 and the part of the electronic circuit 40 that has to receive signals from the external device and/or has to output signals to the external device. The external device may be any type of device, and may for example be a type of device that, e.g. unintentionally, may inject current into the substrate 1. The external device may for example be one or more of: an electronic device, an electro-motor, a piezo-electric device, a coil, a sensor, an actuator or other suitable type of device, As shown in FIG. 1, the semiconductor device may include a current meter 50 which is electrically in contact with at least a part of the substrate 1 and/or the pad 10. The current meter 50 may measure a parameter forming a measure for an amount of a current, from hereon referred to as the injected current, flowing between the substrate 1 and one or more of the pads 10. The semiconductor device may include a control unit 60 connected to the current meter 50 and the electronic circuit 40. The control unit 60 may control the electronic circuit based on the measured parameter. The current meter 50 may for example be connected with a meter input to a part of the substrate 1 where at least a part of the injected current flows and be connected with an output to an input of the control unit 60

Thus, the control unit 60 may, for example, take measures which prevent the electronic circuit from performing in an abrupt and unpredictable manner or which prevent a loss of data when the electronic circuit comes to a halt due to the injected current. The control unit 60 may for example control the operating mode of the electronic circuit 40. The control unit 60 may for example switch the electronic circuit 40 to a more secure mode when a certain amount of current flow is detected or cause the electronic circuit 40 to store data processing information in a non-volatile memory. Also, the control unit 60 may stop or halt the operating of the electronic device 40 (and e.g. cause a redundant electronic device to take over the operation) until the level of injected current is below a safe operating threshold.

The electronic circuit may for instance have a normal mode and one, two or more non-normal modes. For example, the electronic circuit may have an multiple of non-normal modes in addition to the normal mode. The electronic circuit may be put in a selected non-normal mode based on the measured amount of current. For example, the non-normal modes may be have different levels of safety. The non-normal mode may then be selected with the levels of safety proportional to the measured amount. For example, the non-normal may for example be (in order of safety level) e.g. a watch mode, an analog measure disabled mode, a no RAM access mode, a no flash access mode, a security halt mode. In the watch mode, the injected current may be measured continuously. In the analog measure disabled mode, analog components may be switched off. In the no RAM access mode the Random Access Memory (RAM) may be disabled. In the no flash access mode, the access to flash memory may be blocked and in the security halt mode the electronic circuit may be halted.

The control unit 60 may include a selection unit and a mode-controller 61 connected to the current meter 50. In FIG. 1, the selection unit and the mode-controller are shown as a single module 61, however it will be apparent that they may be provided as separate modules. The selection unit 61 may for example select a non-normal mode based on the measured parameter. As shown in FIG. 1, the selection unit 61 may for example compare the measured amount of current with two or more threshold values Tr1,Tr2 and select the non-normal mode depending on which threshold values are exceeded (e.g. select a less secure mode if a lower threshold Tr1 is exceeded and select a more secure mode if a higher threshold Tr2 is exceeded. The mode controller may then control the electronic circuit 40 to be in a selected non-normal mode.

As shown in FIG. 1, the control unit 60 or a part thereof, e.g. the mode controller and/or the selection unit, may be part of the electronic circuit 40. For example, the mode-controller may be (at least partially) implemented as a logic circuit which forms a part of the electronic circuit 40.

Figure 2:
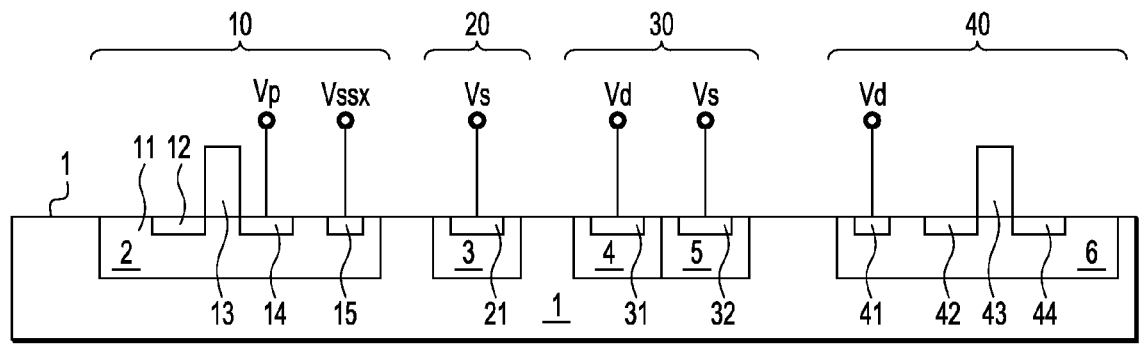

As shown in FIGS. 1 and 2, the semiconductor device may include a current sensor 20 which is connected to the current meter 50. In the example of FIG. 2 the sensor 20 is connected to the input of the current meter 50 and provides a signal which represents the amount of current sensed by the sensor. The current sensor 20 may for example, as shown in FIG. 2, include a portion 3, from hereon referred to as the sensor portion, of the substrate 1. As shown, the sensor portion 3 may be positioned between the pad 10 and the electronic circuit 40 and be part of a path for the injected current. The sensor portion 3 may for example be a region of the substrate 1 which attracts (at least a part of) the injected current. For example, the portion 3 may form a diode together with a substrate portion 2, from hereon referred to as the pad portion surrounding the pad 10. In the example of FIG. 2, for example, the sensor portion 3 is provided with a first type of doping and the pad portion 2 is provided with an opposite type of doping, the portions 2,3 thus forming a junction diode, e.g. a P-N junction diode. As indicated in FIG. 2, for example a voltage Vssx may be applied to the pad portion 2 via a contact 15 and a voltage Vs may be applied to the sensor portion 3 via a contact 21, such that the junction diode is forward biased and a current injected at the pad 10 flows to the contact 21. In the shown example, the pad 10 has a contact 14 at which a pad voltage Vp can be provided and which is a current terminal of a field effect transistor of which a gate 13 and another current terminal 12 are shown in FIG. 2. As shown, the electronic circuit 40 may be provided in a circuit region 6 of the substrate 1, which may for example have a doping of a type opposite to the doping of the pad portion 2. A contact 41 may be present via which the circuit region 6 can be positively or negatively biased with a voltage Vd. For illustrative purposes, a FET with source 42, gate 43 and drain 44 is shown which forms a part of the electronic circuit 40.

As shown in FIG. 1, the sensor portion 3 may for example at least partially shield the electronic circuit 40 from current injected at a pad 10. In the example of FIG. 1, for instance the sensor portion 3 which surrounds the electronic circuit 40 and has the form of a ring. The ring may have any closed-loop or open loop type of shape that separates the substrate into a circuit region in which the electronic circuit 40 is present and a pad region where the pads 10 are provided. The ring shape may be continuous or be interrupted, for example to provide for electrically conducting paths between the electronic device 40 and the pads 10. As shown in the example of FIG. 5, the sensor portion may be split into separate or additional rings 20,21 (continuous or interrupted) around sensitive parts 41,42 of the electronic circuit 40. The parts 41,42 may for example be analog or digital circuits which are critical to the operation of the circuit 40. The rings 20,21 may, as shown, be connected to the same current meter or to different current meters.

As mentioned, the electronic circuit may include a logic circuit, such as a microprocessor. In such a case, the current meter 50 may include an analogue to digital converter which is connected to the logic circuit. In the example of FIG. 1, for example, the current meter 50 is connected to a part 60 of the microprocessor which is provided with an ADC 65. Thereby, a component of the microprocessor (or another type of logic circuit) may be used and the need to provide for a separate ADC is obviated.

The substrate 1 may (e.g. in addition to the sensing portion 3) include a guard ring barrier 30 between the pad 10 and the electronic circuit 40. The guard ring barrier 30 may at least partially inhibit a current flow between the pad and the electronic circuit. As shown in FIG. 2, for example, the guard ring barrier 30 includes a first barrier region 4 which is provided with a first type of doping and a second barrier region 5 which is provided with an opposite doping. In the example of FIG. 2, the region 5 abuts the first barrier regions 4 and the barrier regions 4,5 form a junction diode, e.g. a N-P junction diode. As shown, the barrier regions 4,5 are provided with respective electrical contacts 31,32 via which voltages Vd,Vs can be applied such that the diode is in reverse with respect to current injected at a pad 10 and hence the electrical circuit 40 is at least partially shielded from the current. The first barrier region 4 and the sensor portion 3 may have the same type of doping and the pad portion 2 and the second barrier region 5 may have the same type of doping (i.e. opposite to the type of doping in the first barrier region 4 and the sensor portion 3).

The semiconductor device may include a sensor for sensing the current flowing between the substrate and one or more of the one or more pad and a detector connected to the sensor, for detecting that the current exceeds a current threshold and outputting to the electronic circuit a signal suitable to be processed by the electronic circuit, such as an interrupt request, when the current exceeds the threshold. As shown in FIG. 3, a detector 62-64 may for example be connected with an input to the sensor portion 3. The detector may detect that the current sensed by the sensor portion 3 exceeds a current threshold and output a threshold exceeded signal.

In the example of FIG. 3, the detector includes an inverter 62 and an edge triggered bistable or flip-flop 63, in this example an RS flip-flop. As shown, the inverter 62 may be connected with the inverter output to an input S of the flip-flop 63. The inverter input may further be connected to a voltage source via a reference current source 64. The voltage source provides a sensor voltage Vsensor and the reference current source 64 provides a reference current Iref. The reference current source 64 pulls the potential of the sensor portion 3 to the voltage level Vsensor when no current is injected. In case a current is detected in the sensor portion 3, the potential will change, in which case the output of the flip-flop 63 will switch In the shown example, the inverter 62 is directly connected, with its input, to the sensor portion 3 and forms a "digital" comparator. If the current due to injection exceeds the current of the current source, the input of the inverter 62 is pulled low and the output of the inverter 62 will switch. To filter the event, the inverter 62 drives the set input S of the flip-flop 63. The output Q,$\overline{Q}$ of the flip-flop 63 can be used as e.g. an interrupt source of the electronic circuit 40 and may for example be connected to an interrupt controller or to an interrupt handling module in the electronic circuit 40 or in an external device.

As illustrated in FIGS. 1 and 4, the semiconductor device may include a current meter controller 70 which is connected to the detector and to the current meter, for activating the current meter when the current exceeds the threshold. The current meter controller 70 may be connected with an input to an output of the detector. At the input, the current meter controller 70 may receive a signal indicating that the amount of injected current exceeds a threshold value. An output of the current meter controller 70 may be connected to a current meter control, via which the current meter can be enabled or disabled.

In the example of FIG. 4, the current meter includes a current sensing resistor 53 which connects sensor portion 3 to a voltage source which provides a sensor voltage Vsensor. The voltage difference between both sides of the resistor 53 is proportional to the amount of injected current sensed by the sensor portion 3. In case the electronic circuit 40 is a logic circuit, the node of the resistor 53 which is not connected to the sensor Voltage may be connected to a measuring device (separate or already present, such as to an analogue to digital converter (ADC) on the electronic circuit 40, not shown in FIG. 3), which in turn may be connected to the mode controller 61.

In the example of FIG. 4, for instance the current meter controller 70 includes the flip-flop 64. As shown in FIG. 4, a switch 54 connects the sensor portion 3 to a current meter. The switch 54 has a control input via which the state of the switch 54 can be controlled. In FIG. 4, the switch 54 is shown in an open state in which the sensor portion 3 is disconnected from the current meter, e.g. in this example from the sensing resistor 53. In a closed state the sensor portion 3 is disconnected from the sensing resistor 53. As indicated, the control input of the switch 54 is connected to the output Q of the flip-flop 63 shown in FIG. 3. Thus, when the output Q is asserted, the switch 54 may be in the closed state and the current meter may be active, whereas when the output Q is de-asserted the switch 54 may be in the open state and the current meter may be inactive. The terms "assert" (or "set") and/or "de-assert" (or "negate" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one. Accordingly, the current meter may be active only when the amount of injected current exceeds the threshold value set by the detector.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be an type of connection suitable to transfer signals from or to the respective nodes, units or devices, for example via intermediate devices. Accordingly, unless implied or stated otherwise the connections may for example be direct connections or indirect connections.

Also, for example, other current meters, a voltage instead of a current reference, analog storage elements instead of the flip-flop or other sensor guardring constructs may be used than shown in FIGS. 2-4.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device. For example, the example of a current meter shown in FIG. 4 may be implemented using a discrete sensing resistor electrically connected to the semiconductor substrate 1

Also, devices functionally forming separate devices may be integrated in a single physical device. For example, the inverter and the flip-flop in the example of FIG. 3 may be implemented on the same semiconductor substrate.

Furthermore, the sensor and/or guardring may be implemented in a different manner than shown in the examples. For example, a sensor ring may be provided at the interior and/pr the exterior of area protected by the guardring, the guardring may be absent or integrated in the sensor, the guardring may have only one type of doping or other suitable changes may be made to the senor portion and/or the guard ring.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to advantage.

The invention claimed is:

1. A semiconductor device, comprising:
a substrate on which an electronic circuit is provided, said electronic circuit having a normal mode and a multiple of non-normal modes having different levels of safety;
at least one pad for connecting the electronic circuit to an external device outside the substrate;
a current meter which is electrically in contact with at least a part of said substrate and/or said pad, for measuring a parameter forming a measure for an amount of a current flowing between said substrate and at least one of said at least one pad;
a control unit connected to said current meter and said electronic circuit, for controlling an operating mode said electronic circuit based on said measured parameter, said control unit including: a selection unit connected to said current meter, for selecting a non-normal mode, when said amount of current is above a safe operating threshold, with a level of safety proportional to said amount of current and a mode-controller connected to said selection unit and, for controlling said electronic circuit to be in said selected non-normal mode.

2. A semiconductor device as claimed in claim 1, wherein said control unit compares said amount of current with two or more threshold values and selects said non-normal mode depending on which threshold value is exceeded.

3. A semiconductor device as claimed in claim 1, wherein said control unit selects a less secure mode if a lower threshold is exceeded and selects a more secure mode if a higher threshold is exceeded.

4. A semiconductor device as claimed in claim 1, wherein said non-normal modes include one or more of the group consisting of: watch mode, analog measure disabled mode, no RAM access mode, no flash access mode, security halt mode.

5. A semiconductor device as claimed in claim 1, wherein said electronic circuit includes a logic circuit which forms said mode-controller.

6. A semiconductor device as claimed in claim 1, including a current sensor connected to said current meter, said current sensor includes a sensor portion of said substrate positioned between said pad and said electronic circuit, said portion being part of a path for an injected current.

7. A semiconductor device as claimed in claim 6, wherein said sensor portion surrounds a circuit region of the substrate, in which circuit region said electronic circuit is present.

8. A semiconductor device as claimed in claim 1, wherein at least a pad portion of said substrate, said pad portion surrounding said pad is provided with a doping of a first type and said portion is provided with a doping of an second type.

9. A semiconductor device as claimed in claim 1, wherein said electronic circuit includes a logic circuit and said current meter includes an analogue to digital converter connected to the logic circuit.

10. A semiconductor device as claimed in claim 9, wherein the analogue to digital converter is part of the electronic circuit.

11. A semiconductor device as claimed in claim 1, wherein said substrate includes a barrier between the pad and the electronic circuit, said barrier at least partially inhibiting a current flow between the pad and the electronic circuit.

12. A semiconductor device as claimed in claim 1, comprising:
   a sensor for sensing said current flowing between said substrate and at least one of said at least one pad;
   a detector connected to the sensor, for detecting that said current exceeds a current threshold; and
   a current meter controller connected to said detector and to said current meter for activating said current meter when said current exceeds said threshold.

13. A semiconductor device as claimed in claim 1, comprising:
   a sensor for sensing said current flowing between said substrate and at least one of said at least one pad;
   a detector connected to the sensor, for detecting that said current exceeds a current threshold and outputting to said electronic circuit a signal suitable to be processed by said electronic circuit when said current exceeds said threshold.

14. A semiconductor device as claimed in claim 1, wherein said electronic circuit includes one or more of the group consisting of:
   microprocessor, central processing unit, coprocessor, digital signal processor, embedded processor, microcontroller.

15. A semiconductor device as claimed in claim 1, wherein:
   said multiple of non-normal modes includes a first non-normal mode and a second non-normal mode;
   in selecting a non-normal mode, said selection unit is further for selecting between said normal mode and said first non-normal mode when said amount of current is above a first threshold, and for selecting between said normal mode and said second non-normal mode when said amount of current is above a second threshold.

16. A semiconductor device, comprising:
   a substrate including an electronic circuit, wherein the electronic circuit operates in a normal mode, a first safety mode, and a second safety mode;
   a current meter coupled to the substrate and a pad of the substrate, the current meter for measuring a an amount of a current flowing between the substrate and the pad, the pad being operable to couple the electronic circuit to a device outside the substrate;
   a control unit coupled to the current meter and to the electronic circuit, the control unit operable to control an operating mode of the electronic circuit based on the amount of current, the control unit comprising:
      a selection unit operable to select between the normal mode, the first safety mode, and the second safety mode based upon the amount of current; and
      a mode-controller operable to control the electronic circuit to operate in the selected mode.

17. A semiconductor device as claimed in claim 16, wherein the substrate further includes a sensor portion positioned between the pad and the electronic circuit, the sensor portion being coupled to the current meter.

18. A semiconductor device as claimed in claim 17, wherein the substrate includes a pad portion surrounding the pad, the pad portion being provided with a doping of a first type and the sensor portion being provided with a doping of an second type.

19. A semiconductor device as claimed in claim 16, wherein the substrate includes a barrier between the pad and the electronic circuit, wherein the barrier at least partially inhibits a current flow between the pad and the electronic circuit.

20. A method comprising:
   coupling a current meter between a substrate and a pad of the substrate, wherein:
      the substrate includes an electronic circuit that operates in a normal mode, a first safety mode, and a second safety mode;
      the pad is operable to couple the electronic device to an external device; and
      the current meter is operable to measure an amount of current flowing between the substrate and the pad;
   measuring the amount of current;
   selecting an operating mode of the electronic device in response to measuring the amount of current, the selecting further comprising:
      selecting the normal mode when the amount of current is less than a first threshold and a second threshold;
      selecting the first safety mode when the amount of current is greater than the first threshold and less than the second threshold; and
      selecting the second safety mode when the amount of current is greater than the first threshold and the second threshold; and
   controlling the electronic device to operate in the selected operating mode.

* * * * *